Oct. 22, 1968     F. P. FEHLNER     3,407,125
METHOD OF MAKING FILAMENTARY METAL STRUCTURES
Filed Jan. 18, 1965

INVENTOR.
FRANCIS P. FEHLNER
BY
William J. Simmons Jr.
ATTORNEY

United States Patent Office 3,407,125
Patented Oct. 22, 1968

3,407,125
METHOD OF MAKING FILAMENTARY METAL STRUCTURES
Francis P. Fehlner, Big Flats, N.Y., assignor to Corning Glass Works, Corning, N.Y., a corporation of New York
Filed Jan. 18, 1965, Ser. No. 426,181
18 Claims. (Cl. 204—20)

ABSTRACT OF THE DISCLOSURE

An electro-chemical method for forming a filamentary dispersion of metal within the pores of a porous body. A cathode is applied to a portion of the external surface of the porous body and the exposed portion of the cathode as well as the portion of the porous body adjacent to the cathode are covered with a non-conductive protective coating. Metal ions from the anode traverse the pores of the body and deposit on the cathode resulting in the growth of metallic filaments which extend from the cathode throughout the pores of the body.

---

Filamentary metal structures may be prepared in accordance with the present invention for such uses as catalysts, where a high surface to volume ratio is desirable; or as high-field superconductors, where extremely small diameter filaments are required. For the latter use such filaments should have a diameter less than about 200 angstrom units.

The method of the present invention involves the formation of such metal filaments within the pores of an appropriate porous material, the pores serving as a mold. Various nonelectrically conductive porous materials, such as ceramic, plastic, or glass have intercommunicating pores. I have found porous glass, because of its strength and chemical inertness, to be particularly well suited for the process of the preesnt invention. In addition, the pore diameter of commercially available porous glass is generally less than 200 angstroms. As a result this material is especially useful in the preparation of high-field superconductors according to the method described in the following paragraphs. The description and examples which follow are made with particular reference to porous glass. However, it will be apparent that other porous materials may be employed.

The preparation of porous glass is an intermediate step in the production of the high silica glass commonly referred to as 96% silica glass. It is commonly made by acid leaching of a phase-separated alkali borosilicate glass. The acid leaching step removes a soluble phase from the glass and leaves a high silica glass having a multitude of intercommunicating microscopic pores throughout. One commercial form of porous glass (Corning Code 7930) has been shown to have an internal surface area of approximately 250 square meters per gram and a pore diameter of approximately 40 angstrom units. The preparation of porous glass is disclosed in U.S. Patent No. 2,106,744 to Hood and Nordberg.

It is known that porous glass may be impregnated with a metal such as lead to form a filamentary dispersion of the metal having a very high critical magnetic field. In this form, metals such as lead are useful in the fabrication of superconducting devices. The impregnation of porous glass with metal has previously been accomplished through the use of hydrostatic pressure to force molten metal into the pores of the glass. That method has proved successful in the preparation of lead in a filamentary form wherein the filaments are dispersed in a glassy matrix. However, high pressure systems become increasingly difficult to maintain as their volume is increased. Consequently, the high pressure method has proven inconvenient for the impregnation of large bodies of porous glass with metal.

It is an object of the present invention to provide a method for the formation of a dispersion of filamentary metal within the pores of a porous body which does not necessitate the use of high pressures.

It is a further object to provide a method for the production of a metal-glass composite wherein the metal is in the form of filaments dispersed in a glassy matrix.

It is a further object to provide a method of forming metal filaments having a diameter less than about 200 angstrom units.

The above and other objects are accomplished in accordance with the present invention which is a method of forming a dispersion of filamentary metal within the pores of a porous body by means of an unsymmetrical AC electrolysis. In the practice of the present invention an electrode is attached to a portion of the surface of the porous body to serve as a cathode for the electrolysis. The metal to be deposited serves as the anode. The anode and the porous body containing the cathode are then immersed in an appropriate electrolyte solution and an unsymmetrical AC potential is applied. As the metal is electro-deposited on the cathode the pores of the porous body serve as a mold which limits the diameter of the metal filaments.

In practicing the present invention, the cathode may be applied to the porous body in form of a suitable electroconductive coating on one surface thereof. The conductive coating may then be covered with a nonconductive protective coating such as wax on the side facing out from the porous body. The nonconductive coating shields the outer face of the electrode and causes the electrodeposition of the metal to occur on the side of the electrode facing the porous body, that is, within the pores of the porous body. Alternatively, in lieu of the protective coating, other steps may be taken to prevent unwanted deposits from forming on the outer surface of the electrode. For example, the porous body may be so positioned in the plating bath that the outer surface of the electroconductive coating is not in contact with the electrolyte.

A masking technique may also be employed to produce particular patterns of filamentary metal, for example, in the form of an electric circuit within the glass. This may be accomplished by filling the pores in those areas which are to remain free of metal, with a material such as wax, which will not adversely effect the plating process. A convenient technique for filling the pores of a material, such as porous glass, involves impregnating the pores with a solution of an inert material, such as paraffin, in a volatile solvent, such as carbon tetrachloride, and evaporating the solvent.

Electrodeposition of metals is commonly achieved by the application of a DC potential to an electrolytic cell. I have found, however, that the deposition of metal in porous bodies under the influence of a DC potential results in the growth of a relatively few leading dendrites, which advance faster than the others. The applied potential becomes concentrated at these points and most of the metal growth occurs there, thus yielding a non-uniform deposit. An unsymmetrical alternating current potential is used in the process of the present invention to minimize the effect noted with the direct current potential. When an unsymmetrical AC potential is applied to the system, the current flow in one direction deplates the metal faster at the point of highest potential, that is, at the leading dendrites. These protrusions being thus destroyed, the reverse pulse of current will deposit metal more uniformly over the entire growth front. If the plating pulse is larger than the deplating pules there is a net deposition of metal within the porous body and one may speak of the electrode on the porous body as a cathode.

The present invention will be more completely understood by reference to the accompanying drawings, wherein.

Figure 1:
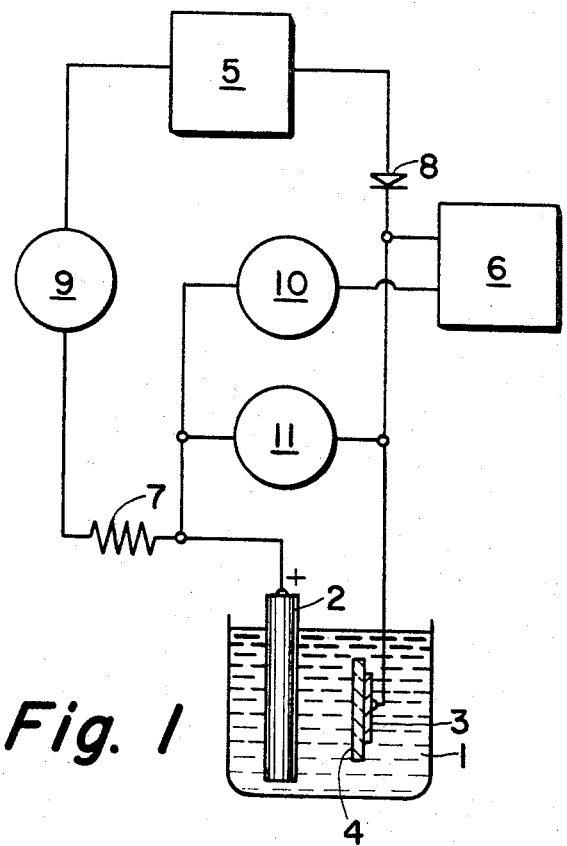
FIG. 1 is a schematic drawing of a typical plating circuit for electrodeposition of metal in a porous body.

In FIG. 1, the plating bath 1 contains an anode 2 of the metal to be plated and a cathode 3 fixed to one side of a body of porous material 4. The power supply which provides an unsymmetrical AC potential comprises an AC power source 5, a DC power source 6, a resistor 7, and a diode 8. The diode 8 provides half-wave rectification of the AC power for the deplating portion of the cycle. In addition, the circuit is provided with an AC milliammeter 9 which serves to monitor the flow of current from the AC power source, and a DC milliammeter 10 and a DC voltmeter 11 which serve to measure the DC current and voltage respectively.

Figure 2:
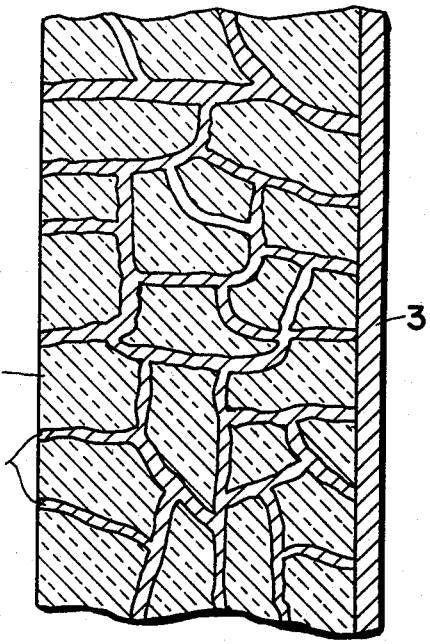
FIG. 2 is a greatly enlarged cross sectional view of the porous body shown in FIG. 1.

FIG. 2, the enlarged view of the porous body 4 illustrates the porous body after the filamentary metallic network 16 has been deposited therein. The pores have been greatly exaggerated in size for the sake of clarity. A few of the pores in the interior portion of the body 4 have been shown to include no metallic filament therein, since it is not a certain that every pore within the body 4 will contain a metallic filament. However, as shown in the figure, at least a portion of the pores 16 extending from the electrode 3 to the opposite surface of the porous body will be entirely filled with metal.

Figure 3:
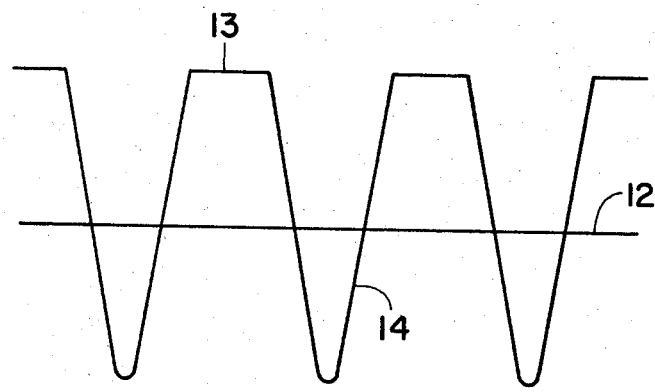
FIG. 3 depicts a waveform of a typical unsymmetrical AC voltage which may be employed in accordance with the present invention.

The circuit shown combines a pulsating DC potential, (resulting from the half-wave rectification of the AC signal) with a DC bias potential of opposite polarity to provide an unsymmetrical AC potential of the type shown in FIG. 3. In the figure, the zero voltage line is indicated by line 12. The plating power is a function of the area bounded by zero voltage line 12 and the portion 13 of the wave-form over that line. The deplating power is a function of the area bounded by the zero voltage line and the portion 14 of the wave-form below that line. The plating/deplating radio may be adjusted by varying both the DC and pulsating DC voltage levels.

It will be understood that power supplies, other than the type illustrated may be employed and considerable variation of the unsymmetrical AC wave-form is permissible depending on materials and conditions of plating. However, in order to insure a net deposit of metal, the plating/deplating ratio must be greater than 1. The period of time required for a given amount of metal to be deposited will decrease as the plating/deplating ratio is increased. In practice, I have found 60 cycles/sec. power to be quite satisfactory although I have successfully employed various frequencies ranging at least from 18 cycles/sec. to 1,000 cycles/sec.

The electrodeposition may be conveniently carried out at room temperature although considerable variation in temperature is permissible.

To further illustrate the present invention and the manner in which it may be practiced the following specific examples are set forth:

Example I

An indium film electrode was applied to a portion of the surface of a sample of Corning Code 7930 porous glass 1½" x 1½" x 3/16" in size. The indium film electrode covered an area 1" x 1" and was applied by vacuum deposition to form a film of about 1,000 angstrom units in thickness. Wire leads, 0.05 inch in diameter, were attached to the indium film electrode with a low temperature indium solder. The pores in the nonmetallized portion on the electrode side of the glass were sealed with paraffin. Next the electrode side, including the back face of the electrode, and the 3/16" edges of the sample were finished coated with melted paraffin. The purpose of the paraffin masking was to direct the passage of the metal ions through the porous glass to the electrode. By this technique unwanted metal deposits on the back of the electrode or in the pores of the glass are avoided and the metal ions must follow a designated path through the pores to the cathode. The porous glass sample thus prepared was then treated for several days in air saturated with water vapor at room temperature. The purpose of this humidification step was to avoid cracking the glass when it was immersed in a plating solution.

The glass, with the indium electrode thereon, was then incorporated as the cathode of an electroplating apparatus similar to that shown in FIG. 1. Lead metal was used as the anode. The plating solution, made with distilled water, consisted of the following:

| | g./ml. $H_2O$ |
|---|---|
| $Pb(OH), 2PbCO_3$ | 0.1497 |
| HF (50%) | 0.2395 |
| $H_3BO_3$ | 0.1048 |

The anode and cathode were spaced about 1.5 inches apart in the plating solution. The solution was maintained at about 25° C. Other plating conditions were as follows:

| Time, min. | DC V. | DC Ma. | AC V. | AC Ma. |
|---|---|---|---|---|
| 0 | 1.5 | 1 | 0 | 0 |
| 14 | 0.7 | 2 | 0 | 0 |
| 18 | 0.4 | 2 | 0 | 0 |
| 23 | 1.0 | 31 | 30 | 6.9 |
| 26 | 1.1 | 30 | 30 | 6.9 |
| 94 | 1.7 | 29 | 30 | 7.0 |
| 96 | 1.0 | 21 | 30 | 6.8 |
| 141 | 0.9 | 21 | 30 | 6.8 |
| 143 | 1.1 | 34 | 30 | 6.9 |
| 156 | 1.2 | 32 | 30 | 6.9 |
| 171 | 1.3 | 31 | 30 | 6.9 |

At the conclusion of the plating the glass was removed from the plating solution and the paraffin and indium electrode were removed from the glass. The initial weight of the glass was 10.5 grams. The final weight of the metal-glass composite after electroplating was about 12.3 grams, indicating a weight increase of about 1.8 grams. Residual water and paraffin in the pores were estimated to account for approximately 1.5 grams of the increase leaving a net gain resulting from the addition of lead of about 0.3 gram. This figure was verified by calculations based on Faraday's law. Photomicrographs of the porous glass were taken in transmitted light at magnifications of 50 power and 310 power. The photomicrographs combined with observations made with an electron microscope showed filamentary dendrites of lead within the pores of the glass.

In a similar manner iron, tin, and silver were electrodeposited in porous glass. The deposits were formed at room temperature utilizing a plating circuit similar to that used in Example 1. The plating bath compositions and electrical power applied to the circuit are shown in the examples below.

| Example | Metal Anode | Plating Bath | AC Power | DC Power |
|---|---|---|---|---|
| 2 | Iron | 120 g. $FeCl_2$, 135 g. $CaCl_2$, 400 ml. $H_2O$ | 13 ma., 30 volts | 1 ma., 20 volts |
| 3 | Tin | 20 g. $SnCl_4$, 400 ml. $H_2O$ | 10 ma., 20 volts | 40 ma., 2 volts |
| 4 | Silver | 20 g. $AgNO_3$, 150 ml. $H_2O$ | 10 ma., 20 volts | 40 ma., 1 volt |

The materials prepared in accordance with the present invention are useful in a variety of applications. In addition to the preparation of materials for superconducting devices, these composite materials may be employed as glass-to-metal seals or in the preparation of resistors which exhibit very little temperature dependence. Further use may be found in the preparation of metal catalysts. For such use the desired metal may be electrodeposited in porous glass in the manner described. The glass matrix may then be removed, for example, by etching with NaOH, to leave a mass of metal having a high surface/volume ratio. If desired, the glass may be etched only partially to leave a mass of fibrous metal attached to a glass substrate. The electrodeposition may also be made within the pores of an organic material, such as a porous organic plastic, which is conveniently removed by solution in a suitable hydrocarbon solvent to leave free metal filaments.

Various metals and alloys which are suitable for electrodeposition may be employed in the process of the present invention. Such metals and alloys include for example, nickel, chromium, zinc, copper, tin, lead, iron, gold, silver, platinum, palladium, rhodium, aluminum, cadmium, cobalt, indium, mercury, vanadium, thallium, gallium and alloys such as brass, bronze, cobalt-nickel, silver-cadmium, iron-nickel, silver-zinc, silver-lead, lead-copper, copper-tin, tin-nickel, copper-silver, copper-nickel, copper-zinc, tin-zinc, tin-cadmium, and others. Some metals are not susceptible to electrodeposition from aqueous media and require special plating baths. For example, aluminum and germanium are most commonly electrodeposited from an organic bath or a medium of fused salt.

It will be apparent to those skilled in the art that many variations and modifications of the invention as herein above set forth may be made without departing from the spirit and scope of the invention. The invention is not limited to those details shown above except as set forth in the appended claims.

I claim:
1. A method of forming a filamentary dispersion of metal which comprises the steps of (A) providing a non-electroconductive porous body having a multiplicity of intercommunicating pores, (B) forming an electroconductive coating on a portion of the external surface of said body, the surfaces of the internal pores remaining uncoated, (C) utilizing said electroconductive coating as the cathode of an electroplating circuit, (D) providing a body of said metal as the anode, and (E) applying a potential across said anode and cathode, thereby causing electrodeposition of said metal on the inner surface of said electroconductive coating and thereafter causing the growth of metallic filaments which extend from said electroconductive coating throughout at least a portion of the pores of said porous body.

2. A method according to claim 1 which comprises the further step of applying a protective coating to the outer surface of said electroconductive coating after the step of forming to prevent the electrolite from physically contacting said electroconductive coating.

3. A method according to claim 2 wherein said protective coating is non-electroconductive.

4. A method according to claim 3 wherein said non-electroconductive coating extends over at least a portion of the surface of said porous body, thereby sealing the pores of said portion.

5. A method according to claim 2 wherein said porous body is 96% silica porous glass.

6. A method according to claim 2 wherein said metal is selected from the group consisting of lead and silver.

7. A method according to claim 6 wherein said metal is lead.

8. A method according to claim 1 wherein, after the step of forming, the method further includes the step of filling a portion of the pores of said porous body with an inert non-electroconductive material to prevent the deposition of metal within said portion.

9. A method according to claim 1 which comprises the further step of etching said non-electroconductive porous body to remove at least a portion thereof.

10. A method according to claim 1 wherein said potential is an unsymmetrical AC potential.

11. A method according to claim 1 which comprises the further step of removing the entire electroconductive coating from said porous body.

12. A method according to claim 4 which comprises the further steps of removing said non-electroconductive coating and thereafter removing said electroconductive coating from said body.

13. A method according to claim 1 which comprises the further step of humidifying said porous body prior to the step of incorporating said electroconductive coating as the cathode of an electroplating circuit.

14. A method of forming a filamentary dispersion of metal within the pores of a non-electroconductive porous body having a multiplicity of intercommunicating pores having a maximum thickness of 200 A., the steps of which comprise forming an electroconductive coating on a portion of the external surface of said body, the surfaces of the internal pores remaining uncoated,
utilizing said electroconductive coating as the cathode of an electroplating circuit,
providing a body of said metal as the anode of said electroplating circuit, and
applying a potential across said anode and cathode, thereby causing electro-deposition of said metal on the inner surface of said electroconductive coating which is adjacent to said pores and thereafter causing the growth of metallic filaments which extend from said electroconductive coating throughout at least a portion of the pores of said porous body.

15. A method in accordance with claim 14 which further comprises the step of applying a protective non-electroconductive coating to the surface of said electroconductive coating opposite said porous body prior to the step of incorporating said electroconductive coating as the cathode of an electroplating circuit.

16. A method in accordance with claim 15 wherein said potential is an unsymmetrical AC potential.

17. A method in accordance with claim 14 which further comprises the step of applying a coating of protective non-electroconductive material to a portion of said porous body and to the exterior surface of said electroconductive coating prior to the step of incorporating said electroconductive coating as the cathode of an electroplating circuit.

18. A method in accordance with claim 17 which further comprises the steps of removing said protective coating from said body and from said electroconductive coating and thereafter removing said electroconductive coating from said body.

References Cited
UNITED STATES PATENTS

| | | | |
|---|---|---|---|
| 2,106,744 | 2/1938 | Hood et al. | 106—54 |
| 2,451,341 | 10/1948 | Jernstedt | 204—228 |
| 2,515,192 | 7/1950 | Chester | 204—228 |
| 2,737,541 | 3/1956 | Coolidge | 204—20 |
| 3,116,191 | 12/1963 | Day | 204—24 |

JOHN H. MACK, *Primary Examiner.*

T. TUFARIELLO, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,407,125            October 22, 1968

Francis P. Fehlner

It is certified that error appears in the above identified patent and that said Letters Patent are hereby corrected as shown below:

Column 2, line 72, "pules" should read -- pulse --. Column 3, line 25, before "FIG. 2," insert -- In --; line 31, cancel "a"; line 46, "radio" should read -- ratio --. Column 4, line 5, "0.05" should read -- 0.005 --; same column 4, first table, in the sub-heading to columns 3 and 5 thereof, "Ma", each occurrence should read -- mA --.

Signed and sealed this 3rd day of March 1970.

(SEAL)
Attest:

Edward M. Fletcher, Jr.            WILLIAM E. SCHUYLER, JR.
Attesting Officer            Commissioner of Patents